Figure 1:
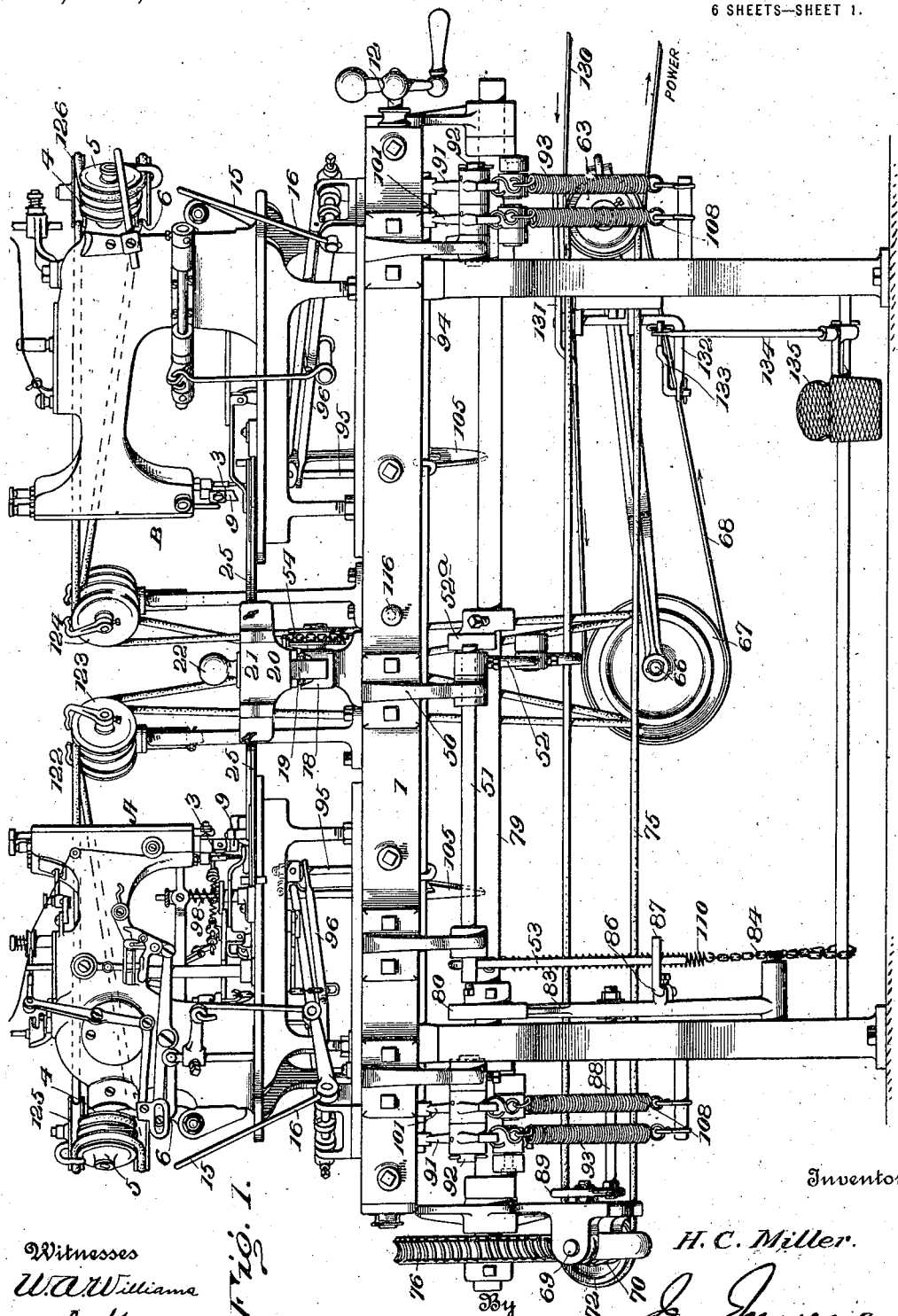

H. C. MILLER.
BUTTONHOLE MACHINE.
APPLICATION FILED AUG. 16, 1911.

1,167,197.

Patented Jan. 4, 1916.
6 SHEETS—SHEET 1.

Witnesses
W. A. Williams
M. E. Gray

Inventor
H. C. Miller.
By
Attorney

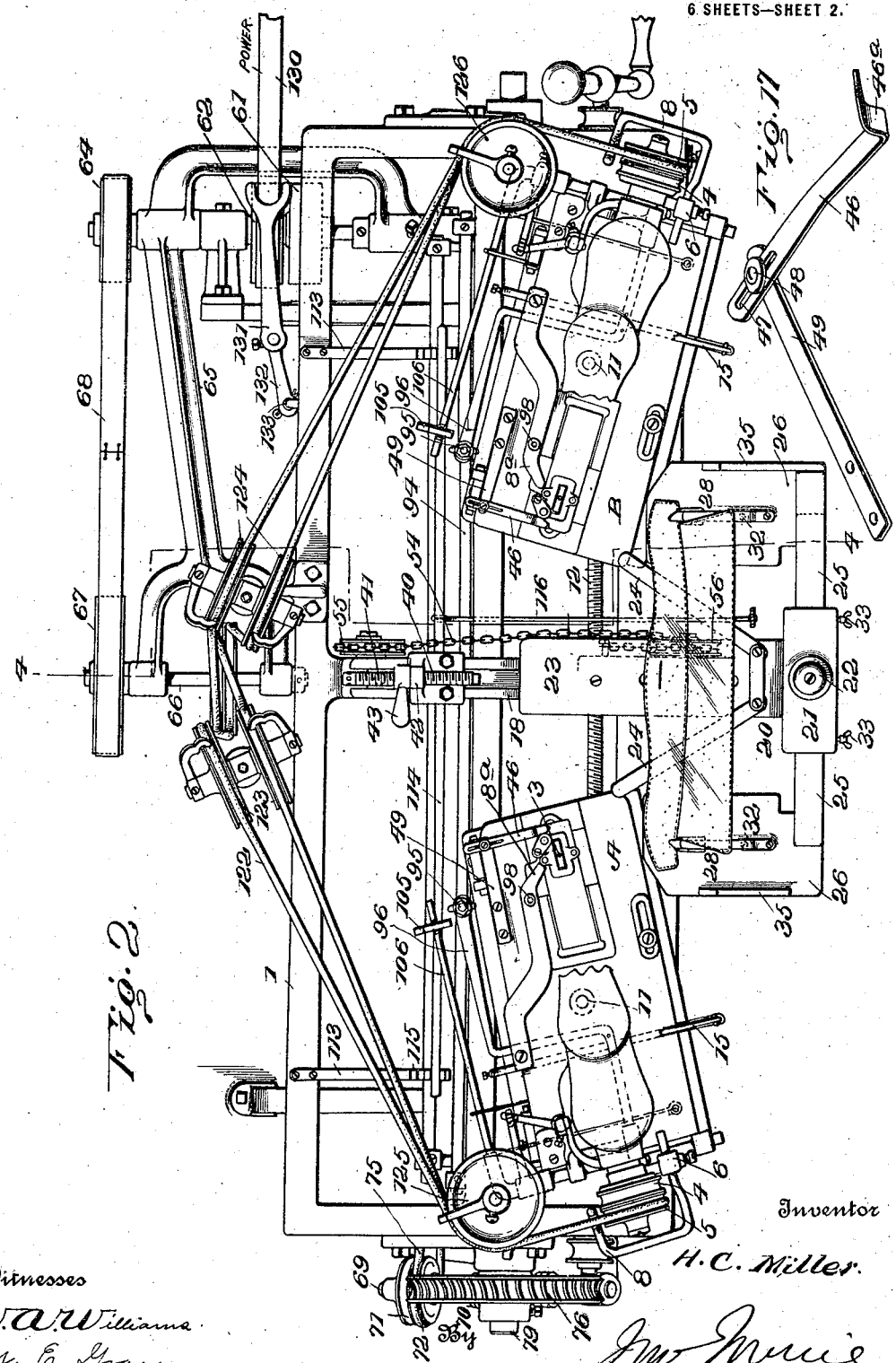

H. C. MILLER.
BUTTONHOLE MACHINE.
APPLICATION FILED AUG. 16, 1911.
1,167,197.
Patented Jan. 4, 1916.
6 SHEETS—SHEET 3.
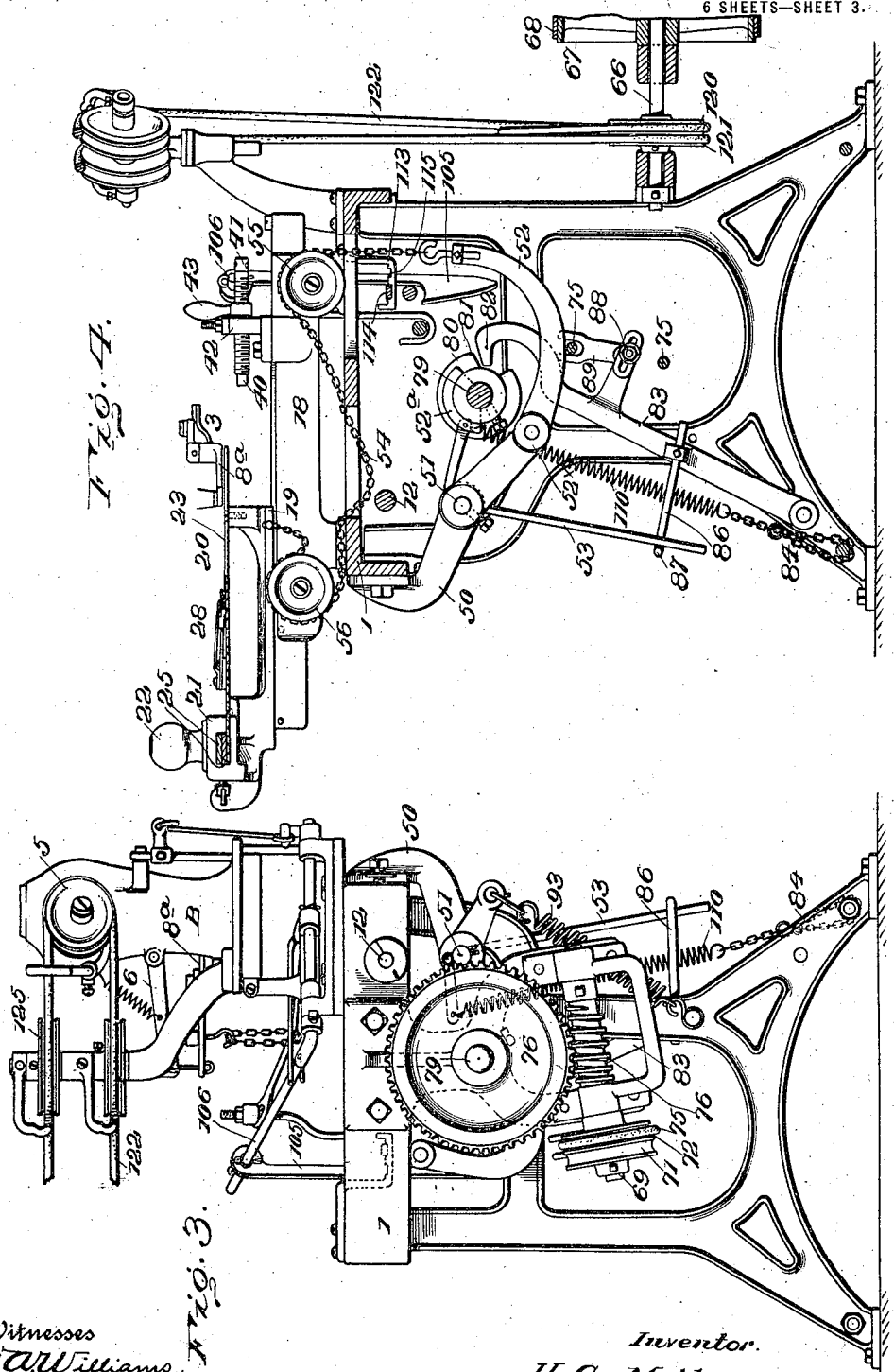

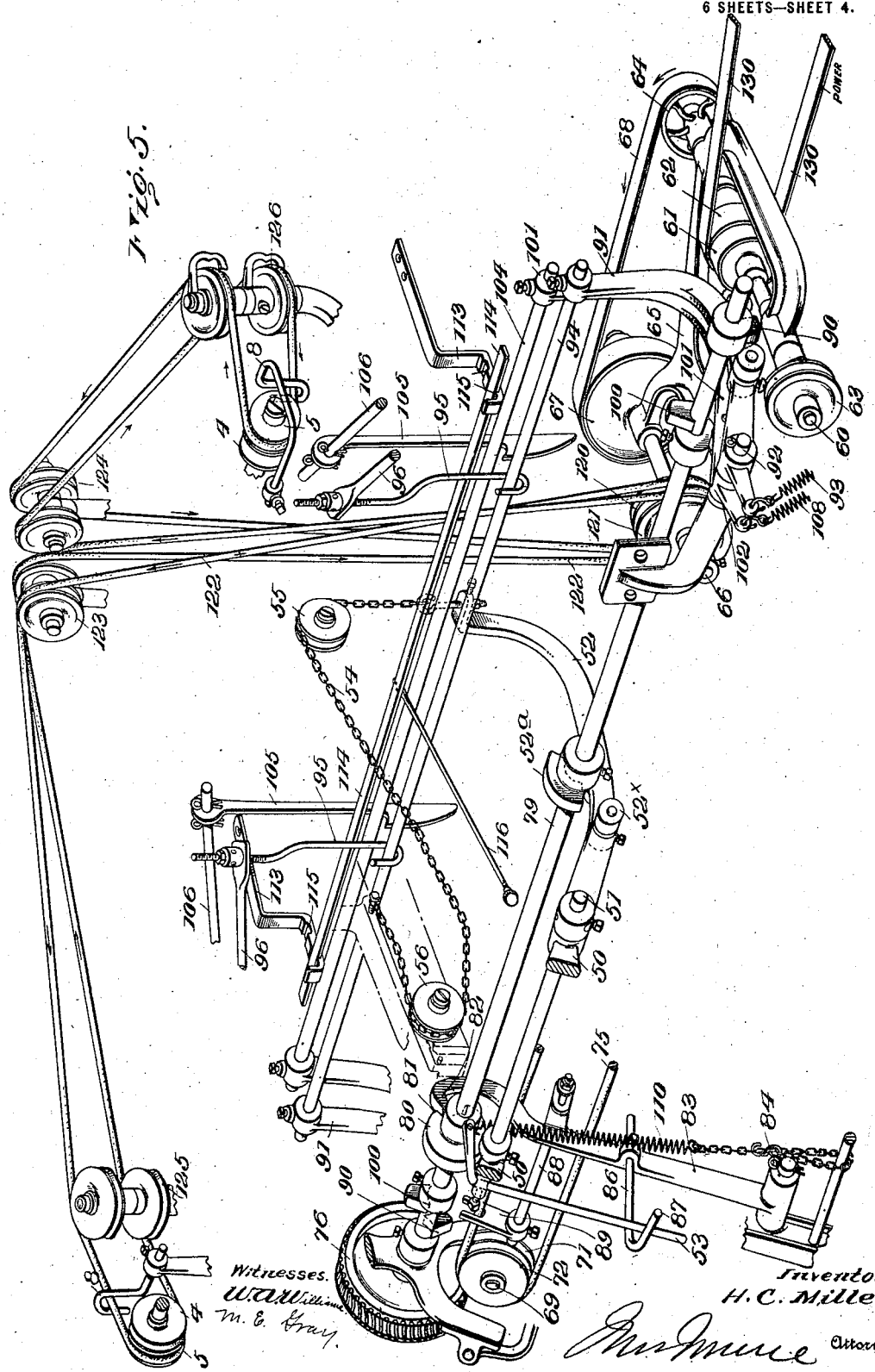

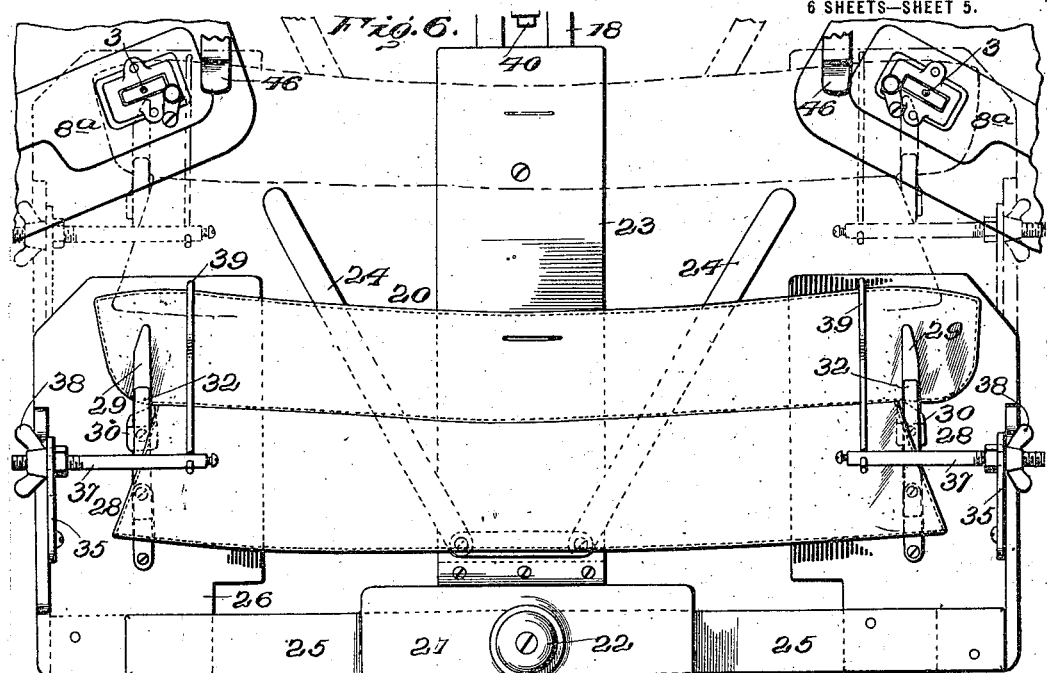

H. C. MILLER.
BUTTONHOLE MACHINE.
APPLICATION FILED AUG. 16, 1911.

1,167,197.

Patented Jan. 4, 1916.
6 SHEETS—SHEET 6.

Witnesses
W. A. Williams
N. E. Gray

Inventor
H. C. Miller.
By
Attorney

UNITED STATES PATENT OFFICE.

HENRY C. MILLER, OF WATERFORD, NEW YORK.

BUTTONHOLE-MACHINE.

1,167,197. Specification of Letters Patent. Patented Jan. 4, 1916.

Application filed August 16, 1911. Serial No. 644,444.

*To all whom it may concern:*

Be it known that I, HENRY C. MILLER, a citizen of the United States, residing at Waterford, in the county of Saratoga and State of New York, have invented certain new and useful Improvements in Buttonhole-Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to improvements in button hole machines, and primarily to one known in the art as a "double header".

Prior to my present improvements it was customary to arrange the mechanism in such manner that the operator in one instance in order to complete a cycle of movement was compelled to operate a treadle or similar means, or the mechanism was under control, and could be stopped and started within a given cycle of movement. In each instance, however, the operator was compelled to start the mechanism for each cycle of movement by manipulating separate starting means, although such movement was automatically stopped when the stitching operation was completed. Necessarily, as in making button holes, the labor involved in this frequent starting of the machine soon tired the operator. Furthermore, the starting devices of all sewing machines of the type referred to, are in each instance connected directly to parts of the operating mechanism which requires extraordinary force to effect their throwing into action consequently requiring laborious work, as above stated.

According to my invention, I propose to overcome the noted objections, as well as many others, by providing specially designed main power operating means, and auxiliary power operating means associated with the stitching mechanism, so that when the operator feeds a collar to the stitching mechanism, the stitching, clamping, trimming, and cutting blade will automatically continue to operate in sequence. The stitching operation may be stopped and is under perfect control at any time in any one of its definite cycles of movement. This arrangement of parts obviates the necessity of the laborious work of operating separate starting mechanism at the beginning of each cycle of movement, and because of the many automatic features involved, permits of the employment of less stronger help than with other machines.

A further object of this invention is to provide improved means for gaging the article to receive the button holes, and so connecting the gaging means that it controls the setting into motion of the means for automatically making the button holes, and the means for automatically removing the gaging means from the cloth clamps.

This invention also involves improvements in the specific details of construction and arrangement of parts, which will be hereafter described, and particularly pointed out in the claims.

Figure 10:
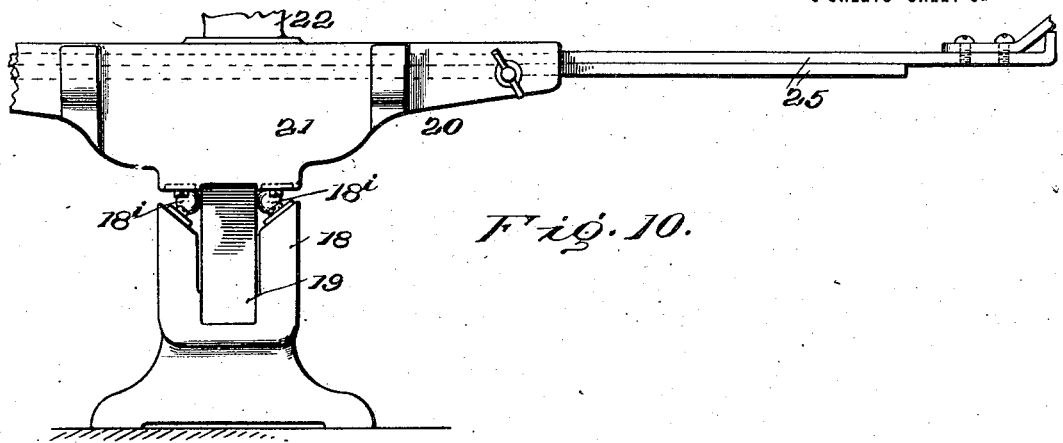
Figure 11:
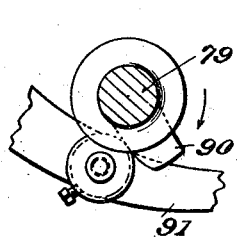
Figures 13, 15:
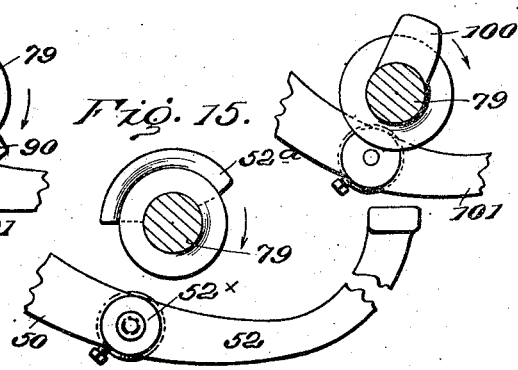
Figure 16:
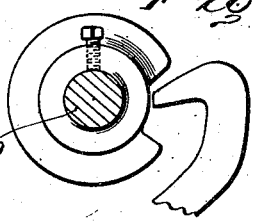
Figure 14:
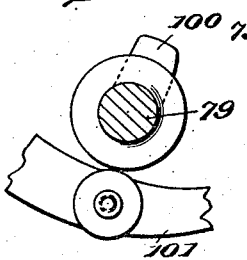
Figure 12:
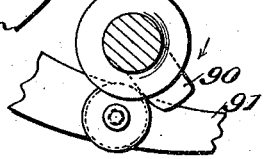

In the drawings, forming a part of this specification: Figure 1 is a front elevation of my improved machine. Fig. 2 is a top plan view of the same. Fig. 3 is an end elevation. Fig. 4 is a transverse section substantially on the line 4—4 of Fig. 2. Fig. 5 is a perspective view of the operating mechanism. Fig. 6 is an enlarged plan view of the gaging device illustrating the position of the parts with one form of collar. Fig. 7 is a detail plan view of one side of the gaging device and illustrating the gage positioned for another. Fig. 8 is an end elevation of the gaging device. Fig. 9 is a detail perspective view of one of the gages. Fig. 10 is a detail front view of the gaging device. Figs. 11 to 16 represent detail views of the operating cams. Fig. 17 is a detail view of one of the abutment stops.

1 indicates a frame, on the base of which are mounted two button hole stitching machine heads A and B of appropriate type. Each head includes: stitching mechanism 3; fast pulley 4; loose pulley 5; stop motion device 6; belt shifting mechanism 8, connected with the stop motion device; cloth clamp 8ª; cutting blade 9; and thread trimmer (not shown). Each head is furthermore mounted on a pivot 11, to adapt the button hole to the angle of the tab of a collar. Each head is mounted on a block which is guided in a guideway and engages a transverse screw 12, so that both heads may be adjusted simultaneously toward or from each other to accommodate collars of different length. Each head is also provided with an independent hand starter 15 for starting the stitching mechanism without starting the similar mechanism on the companion head. This device involves a lever 16 located in convenient reach of the operator and is connected to the stop motion device, whereby if it be desired to mend a button hole it may be accomplished without throwing into operation all the mechanism about to be described. These features are similar to those disclosed in my prior Patent No. 810,297, dated Jan. 16, 1906, in view of which it is not deemed essential to specifically describe them.

Preferably disposed between the two heads A and B, is a longitudinal grooved bar or guide 18 on which slides the base bar 19 of a gaging device 20. The forward end of the base bar is formed with a transverse hollow head 21, provided on top with a knob or handle 22, to form a hand grip. On top of the base bar 20 is a thin sheet of metal to form the central support of the gaging device, and to which are adjustably secured two flat thin strips, forming angular adjustable supports 24. Fitting in the hollow transverse head 21 are two superimposed flat bars 25 to the outer opposite end of each respective bar is secured a thin metal plate 26 about in the same plane as the central support 23, and forming end supports for the ends of a collar or other article. These end plates also support end gages for properly locating a collar on the gaging device. Each end gage 28 comprises a bar 29, fixed to the plate 26, and at its inner portion it is spaced from the latter, and fitting over this bar is the adjustable gaging block 30. This block is formed with an enlarged portion provided with an opening through which a screw passes to clamp said block to its bar 29, and from the enlarged portion, and under the bar 29, extends a lip 31 having its inner end beveled to engage a collar, if it be one of substantially uniform width throughout, or the crotch between the body portion and a tab if the collar be of the tab type, as shown in Figs. 6 and 7. A cover plate 32, is secured to the bar 29 and extends over the block 30, to form an uninterrupted path for the collar being introduced. The transverse superimposed bars 25 are held in adjusted position by screws 33, fitting in openings in the hollow head 21.

The central and end plates 23 and 26, are so arranged as will permit of a wide range of adjustment, hence it follows they are spaced apart, which makes it necessary to provide the adjustable angular supports 24. For when the end plates are adjusted and to properly support the collar the supports 26, must also be adjusted. Each end support 26 is provided with a vertical end extension 35 formed with a slot 36 to receive a rod 37 held in adjusted position by a clamp nut 38, and provided on its inner end with a downwardly and rearwardly curved finger 39. These fingers are located adjacent the gages 28 and extend in close proximity to the end supporting plates 26 and are designed to prevent the ends of the collar turning up, and they also afford means for assisting in the withdrawal of a collar from the heads. Further these fingers provide means for preventing the collar being inserted and the one being withdrawn conflicting with each other. It is to be understood, however, that these fingers do not contact with or in any manner exert pressure on the ends of the collar on the gaging device while being introduced to the stitching mechanisms, for it is important that the collar be as free as possible to enable the ready withdrawal of the gaging device from beneath the cloth clamps.

The gaging device is limited in its rearward movement by an adjustable stop 40. This stop comprises a threaded rod 41, mounted to turn in a threaded opening in a standard 42, and held in set position by a lock nut 43. While it is true the rearward movement of the loader is limited by the stop 40, it is equally true that the rear edge of the collar must also be limited to insure a proper setting or gaging of the ends to properly locate the button hole with a fine degree of accuracy. I have therefore provided on the bed plate of each head A and B, a gage stop, each of which consists of a flat strip 46 having its front end bent upwardly and forwardly to form an abutting surface 46$^a$, for the edges of the collar, and an overhanging flange to overlap said collar. The inner end of each flat strip is slotted at 47, through which passes an adjusting screw 48, which engages a threaded opening in a flat bar 49 fastened to the bed of each head. By this construction the flat strips 45, may be adjusted in any direction to accommodate the curvature or the angle of the edge of a collar. These gage stops are positioned so that about the time the gaging device contacts with the stop 40, the rear edge of the collar will contact with the abutting surfaces 46$^a$, and the collar will be properly located under the cloth clamps at the time the gaging device ceases its movement.

Secured to the front of the frame 1 are two brackets 50, in which is mounted a shaft 51 on one end of which is fastened a curved lever 52 and at its opposite end it is provided with a depending rod 53. This device is what I shall term a trip, for a purpose to be described. To the free end of the curved lever 52 is adjustably secured a chain 54 which passes up over an idle pulley 55, mounted on the grooved bar 18 and thence extends forwardly under and around a second idle pulley 56, also mounted on the grooved bar 18 and is secured to the rear end of the gaging device. This lever and its connection with the gaging device form very essential elements in the automatic operation of the machine for it is the movement of this lever through the medium of the gaging device, and the trip which permits of the automatic throwing into motion a cam shaft which connections automatically operate the cloth clamps and the stitching mechanisms and causes them to perform a cycle of movement.

On one side of the frame 1 and mounted in suitable bearings is a power shaft provided with fast and loose band pulley 61 and 62. At one end of this shaft is fastened a band pulley 63, and at its opposite end is a band pulley 64. Also pivotally mounted on the shaft 60, is a rocking frame 65, the inner end of which extends to about the center of the frame 1, and is provided with bearings which receive a shaft 66, carrying a band pulley 67, around which and the band pulley 64 extends a belt 68. On the opposite side of the frame 1 is a shaft 69 on which is a worm 70, and fast and loose slightly grooved pulleys 71 and 72, and normally extending around the grooved pulley 63, on shaft 60, and the loose pulley 72, is a belt 75. This mechanism together with the belt 122 to be referred to hereafter constitutes what I shall term the continually operating main power mechanism.

Meshing with the worm 70 is a worm gear 76 mounted on the end of a cam shaft 79 extending across the frame 1 and mounted in suitable bearings. The worm gear, cam shaft, and its connections, constitute auxiliary power mechanism. On the cam shaft is a cam 52$^a$, designed to coöperate with the lever 52, to depress it at the proper time to automatically withdraw the gaging device from the cloth clamp. On this cam shaft is secured a disk 80, provided with a cut away portion or seat 81, for the nose 82 of a belt shifting lever 83, pivoted at its lower end at 84. This lever it will be noted inclines, so that when it is released by the trip the nose 82 will, by gravity fall out of the seat 81. Extending forwardly from the lever 83, is a rod 86, having its end 87, bent inwardly to be engaged by the rod 53 of the trip. From a projection on the lever extends an adjustable rod 88, carrying at its outer end a bifurcated standard 89 to engage the belt 75 to shift the latter from the loose to the fast pulley at the proper time, and vice versa.

When the gaging device is pushed rearward to introduce a collar, or other article to the heads A and B, and just before reaching the cloth clamps, the slack in the chain 54 is taken up which rocks the lever 52, and brings its roller 52$^x$ adjacent the path of movement of the cam 52$^a$. This movement also rocks the shaft 51, and removes the depending rod 53, from the inturned end 87, of the rod 53, and permits the lever 83 to fall from the seat 81 in the cam disk. When this occurs the belt shifter 89, shifts the belt 75 from the loose to the fast pulley 71, and as the belt 75 is constantly in motion, motion will, through the worm gear, be imparted to the cam shaft 79, hence the main power mechanism operates the auxiliary power mechanism. The movement of the lever 83, is such that the nose will recede from its seat sufficiently to permit the concentric portion of the disk 80 to freely pass, so that the nose cannot again be seated until the disk has made substantially one revolution. At this time however the cam 52$^a$ is not in the path of movement of the roller 52$^x$, but the auxiliary power mechanism is in operation.

Near opposite ends of the cam shaft 79, are cams 90, so timed that soon after the cam shaft starts to revolve, levers 91 will be depressed to lift the cloth clamps. Each lever 91 is pivoted at 92 and beyond the pivot point is a spring 93 to return the parts to normal position. The opposite end of said levers 91 are connected by a cross bar 94, which extends across the machine. This cross bar operates in the plane of a pair of hangers 95, attached to the usual levers 96 of the cloth clamps 8$^a$. Now when the cams 90 depress the levers 91, the cross bar 94, pulls on the hangers 95 and effects the lifting of the cloth clamps, so that the final movement of the gaging device may occur to place a collar under said cloth clamps and in position to receive the button holes. When the gaging device is given its final movement the roller 52$^x$ is brought into the path of movement of the cam 52$^a$, so as to depress the lever 52 at the proper time. The gaging device having positioned the collar under the cloth clamps, the latter are lowered by the usual springs 98, and the collar is momentarily clamped between said cloth clamps, and the end supports 26 of the gaging device. The clamps now having positioned the collar, the cam 52$^a$ contacts with the roller 52$^x$ on the lever 52 and depresses it, which pulls on the chain 54, and automatically withdraws the ends of the gaging device from under the clamps, the springs 98 causing the latter to hold the collar in position to be operated upon. Immediately the gaging device is withdrawn, the stitching, cutting and trimming operations are performed in their respective order by the following mechanism.

On the cam shaft 79 are two cams 100 which contact with the rollers on two levers 101, pivoted at 102, and extending toward the rear of the machine. The free ends of these levers are connected by a rod 104 which extends across the machine, and moves up and down in the path of a pair of hook links 105. The hook links are pivoted to arms 106, extending from the operating levers of the stop motion devices of the respective heads A and B. When the cams depress the levers 101, the rod engages the hooks of the links 105, and operates the stop motion devices and by shifting the power, starts the stitching mechanisms. The cutting blade 9, and the trimmer are connected in the usual manner to perform their respective functions, by the throwing in of the stop motion devices. The cams 100, having passed the rollers on the levers 101, the latter are returned to their normal position by springs 108, and after the cycle of movement of the heads has been completed, the respective stop motions will be automatically thrown in and the mechanisms will cease their respective operations with the collar still held by the cloth clamps. The cam 80, is so timed that after the cams 90, and 100 have passed the rollers on the levers 91 and 101, the nose 82 of the lever 83 will be drawn into the seat 81 by the depending rod 53 contacting with the inturned end 87 of the rod 86, a spring 110 attached to a projection on the shaft exerting the necessary force to perform this operation. It may be stated at this time that when the trip was operated by the gaging device to disengage the lever 83 from the disk 80, that the nose 82 moves far enough away from the disk 80, so that when the gaging device is returned to normal position the end of the nose will be held against the periphery of disk 80, ready to be dropped into the seat 81 by the spring 110. When the lever 83, is returned to its normal position it shifts the belt 75, from the fast to the loose pulley 72, so that the cam shaft, gears and shaft 79 constituting the auxiliary power mechanism, comes to a stop, but the main power mechanism continues to operate, so that all the operator has to do is to feed an article to the stitching mechanisms, in order to again complete another cycle of operation, which will be gone into farther on in this description.

Two brackets 113, extend forwardly on the frame 1, to support a bar 114 which lies just in advance of the hooked links 105. Each bracket forms a guide to limit the movement of the bar, and in the bottom of each guide are two depressions 115, in which the bar seats when in its forward or rearward position. Extending from the bar is a rod 116 which extends through to the front of the frame to be in convenient reach of the operator. If it be desired to operate the mechanism without the stitching mechanism, the rod is pushed rearwardly and the hooked links are removed from path of movement of the bar 104 as will be presently explained.

The shaft 66 has secured to it two grooved pulleys 120, and 121, around which passes a belt 122 which as previously stated constitutes a part of the main power mechanism. This belt is for the purpose of driving the mechanism on the heads A and B, and the parts are so arranged as to accommodate the belt for any adjustment of the said heads. Swiveled in two brackets extending up from the frame 1, are two pairs of pulleys indicated at 125, and 126.

The belt 122, passes around the loose pulley 5, on the head B, thence around one of the pulleys 126 and over and around one of the pulleys 124, then down and around pulley 120 on the shaft 66. The belt then extends up and around one of the pulleys 123, and around one of the pulleys 125, and over the loose pulley 5, on the head A. From this loose pulley the belt passes around the lower pulley 125, one of the pulleys 123, and down and around pulley 121 on shaft 66, and up and over pulley 121 and around one of the pulleys 124, and 126 to the loose pulley on head B. By this arrangement, the entire power from shaft 66, to the sewing machine heads is imparted by a single belt, which insures of the mechanism being uniformly operated, and which will permit of all the necessary adjustment of the parts without in any way separately adjusting the belt. The weight of the yoke frame 65 is quite sufficient to maintain the belt taut, and as said yoke frame is pivoted on the shaft 60, it will readily yield if an unusual strain should suddenly be placed on the belt.

The power belt 130, is shifted from the fast to the loose pulleys on shaft 60, by a belt shifter 131, pivotally mounted on the frame 1, and provided with an arm 132, to which is pivoted a link 133, extending forwardly to the front of the machine. The forward end of the link is pivoted to a lever 134, extending from a foot treadle 135, located in convenient reach of the operator.

In operating my improved machine, the end supports 26—26 of the gaging device are laterally adjusted and the gages 28—28 are set to accommodate the particular style of collar to be operated upon. The adjustable supports 24, are also adjusted to support the collar between the end supporting plates and the central supporting plates. The two heads A and B, are adjusted both laterally and radially to accommodate the shape of the collar, and the disposition of the buttonhole therein and the gage stops 46 must also be set. The treadle 135 is now rocked and the power belt is shifted to the fast pulley 61, and motion is imparted to the belts 75 and 122. The operator now places a collar on the gaging device and forces the latter in toward the heads A and B, and just before the ends of the supports 26—26 reach the cloth clamps the slack in the chain is taken up and the lever 52, is pulled up to bring its roller adjacent the cam 52$^a$. This movement causes the depending arm 53, to swing away from the inturned end of the rod 86 which permits the lever 83, to swing by gravity and disengage the nose 82 from the cam 80, and shifts the belt 75 to the fast pulley 71. Motion is now imparted to the cam shaft 79, and the cams 90 will operate on the levers 91, and raise the cloth clamps. During this time the operator holds the gaging device with the collar stationary so that immediately the clamps are lifted, with a quick motion, the gaging device is pushed farther up against the stop 40, and the rear edge of the collar up against the abutting surfaces 46, of the gage stops, with the ends under said clamps. This movement as before stated brings the roller 52ˣ up into the path of movement of the cam 52ᵃ. The cams 90 are timed so as to only hold the clamp elevated for sufficient time to allow the operator to place the gaged collar under them, then the clamps are lowered and hold the collar on the supports momentarily, for in a moment thereafter, the cam 52ᵃ, acts on the lever 52 and depresses it thereby withdrawing the gaging device from beneath the clamps. This movement is only sufficient to withdraw the ends of the supports beyond the clamps, and the operator by pulling on the handle grip 22, returns the gaging device to its normal position to receive another collar. The cloth clamps now hold the collar in position on the heads A and B, and the cams 100, operate on the levers 101 and pull the hook links 105, down and operate the stop motion device, to start the stitching operation. As previously stated the means operating the stitching mechanism automatically throws into operation the cutting blade and the trimmer, it being understood that the cutting blade may be of the type to be operated before or after the formation of the stitches. The button holes having been completed the stop motion devices automatically stop the stitching mechanism.

The cam shaft is geared to the main power mechanism so that a complete revolution of said cam shaft is made, before the stitching operation is completed. In other words the cam shaft completes its revolution in about ¼ to ⅔ of the time that it takes to complete a button hole by the stitching operation. This relative movement of the parts is for the purpose of placing the mechanism in restarting position, and to avoid the necessity of accurate timing of the parts. After the stitching of the first collar is completed, another one having been placed on the gaging device, the latter is pushed in as before described. By so doing the cam shaft is again revolved, hence the cloth clamps will be elevated and the operator quickly withdraws the completed collar and forces the gaging device toward the heads, and introduces the secured collar to receive button holes in the same manner hereinbefore stated. In removing the finished collar it is adeptly withdrawn over the guide fingers, and up out of the way of the collar on the gaging device and then while the second collar is clamped, the operator has ample time to throw aside the completed article and pick up another for a subsequent operation. If during the stitching operation the operator should detect a broken thread, or if the bobbin is exhausted or something is wrong with the stitches of one of the button holes, and it is desired to mend it, she may do so without lifting the cloth clamps. In this case the gaging device with its collar must not operate. The operator moves the lever 16 on the head where the stitching is to be mended and starts the stitching mechanism and thereby effects the stitching operation. If, however, the operator fails to notice the defect until after the collar is withdrawn, it must again be placed on the gaging device and reintroduced under the clamps as previously described. But to avoid the automatic starting of the two stitching mechanisms the rod 116, is forced inwardly to push the hook links 105 from the path of movement of the cross bar 114. Hence, while the cam shaft makes a complete revolution, the clamps will alone be lifted and the gaging device will be automatically removed from under the same as described. Now that the defective collar is clamped, the operator will throw the lever 16, of the respective head and operate the stitching mechanism of this particular head and mend the button hole then the rod 116 is again withdrawn when the operation may be continued as before.

From the foregoing description it will be seen that I have provided mechanism for forming a continuous cycle of operations, controlled by the introduction of the article being operated upon, and one in which the laborious work of throwing in the power separately, and then introducing a collar is dispensed with. Furthermore by the arrangement described all of the various operations in the cycle of movement are effected by the cams on the power shaft, and so long as the operator will feed a collar on the gaging device, or by the movement of the latter without a collar, the cycle of operation will occur without further effort on the part of the attendant. Yet the mechanism is so arranged that any particular feature of the cycle of movement is under the control of the operator.

The various cams are timed to permit sufficient time for the operator to manipulate the collar to accomplish the desired results, and to insure of the various operations being performed in their proper sequence.

The improvement will expedite the manufacture of button holes in collars and cuffs, and by reason of the automatic operation of the respective parts, unskilled help may be employed, and less physical effort is required to effect the operation. The treadle 135 may be depressed at its front end at any stage of the operation to shift the power belt 130, which obviously throws out of operation the entire mechanism. While I have shown and described my invention for the purpose of making button holes in both ends of a collar, it will be obvious to one skilled in the art that the improvement is applicable to a single button hole machine, and I desire to reserve this right. The gaging device is mounted to slide as freely as possible on the bar 18, and to reduce the friction balls 18¹, are inserted between said bar 18, and overhanging flanges on the bar 19.

Claims:

1. In a machine of the class described, the combination of stitching mechanism, power mechanism for operating the stitching mechanism, a gaging device for gaging an article and for controlling the power mechanism, and means for automatically withdrawing the gaging device prior to the operation of the stitching mechanism.

2. In a machine of the class described, the combination of stitching mechanism, automatic mechanism for starting the stitching mechanism, power mechanism and movable means including an article gaging device for starting the power mechanism to operate the stitching mechanism, said means being arranged to cease its movement before the automatic mechanism is operated to stop the stitching mechanism.

3. In a machine of the class described, the combination of stitching mechanism, power mechanism including a shiftable belt, a shaft, a movable gaging device, means between the shaft and the gaging device to cause the shifting of the belt to operate the shaft and start the stitching mechanism, and means for automatically withdrawing the movable gaging device prior to the operation of the stitching mechanism.

4. In a machine of the class described, the combination of two button hole machine heads, each of which includes stitching mechanism, a cloth clamp, and automatic starting and stopping means, a slidable gaging device operable toward and from the heads, end gages mounted on the gaging device, power mechanism for operating the stitching mechanisms and cloth clamps, and means controlled by the movement of the gaging device for starting the power mechanism.

5. In a button hole machine, the combination of two button hole stitching machine heads, each of said heads including independent stitching mechanism, a cloth clamp, and a stop motion device, power mechanism, connections between the power mechanism and the cloth clamps and the stop motion devices, and a gaging device including gages to position an article and to start the power mechanism to elevate the cloth clamps and operate the stop motions and start the stitching mechanisms.

6. In a button-hole machine, the combination of stitching mechanism and a cloth clamp, constantly operating main power mechanism, auxiliary power mechanism, connections between the latter mechanism and the cloth clamp, and the stitching mechanism, a gaging device for positioning an article to the stitching mechanism, and a connection between the gaging device and the auxiliary power mechanism, whereby when the gaging device is operated the main power mechanism will operate the auxiliary power mechanism to lift the clamp and operate the stitching mechanism.

7. In a button hole machine the combination of stitching mechanism, a cloth clamp, a stop motion device, fast and loose pulleys, main power mechanism, auxiliary power mechanism connections between the auxiliary power mechanism and the cloth clamp and the stop motion device, a gaging device for positioning an article to the stitching mechanism, means between the gaging device and the auxiliary power mechanism for connecting the main and auxiliary power mechanisms, when said gaging device is operated, whereby to lift the cloth clamp and operate the stitching mechanism, and means for stopping the auxiliary power mechanism before the completion of the operation of the stitching mechanism.

8. In a button hole machine, the combination of stitching mechanism, a cloth clamp, power mechanism, a movable gaging device including gages, stationary stops adjacent the stitching mechanism, the gages on the movable gaging device and the stops coöperating to position an article to be operated upon, connections between the cloth clamp and the stitching mechanism and the power mechanism, and means controlled by the movement of the movable gaging device for causing the power mechanism to lift the cloth clamp and start the stitching mechanism.

9. In a button hole machine, the combination of stitching mechanisms, cloth clamps, power mechanism, a movable gaging device including gages, stationary stops adjacent the stitching mechanisms, the gages on the movable gaging device and the stops coöperating to position an article to be operated upon, connections between the cloth clamps and the stitching mechanisms and the power mechanism, means controlled by the movement of the movable gaging device for causing the power mechanism to lift the cloth clamps and start the stitching mechanisms, and means for stopping the movement of the parts of the power mechanism which control the operation, the stitching mechanisms and the cloth clamps, before the completion of the stitching operation.

10. In a button-hole machine, the combination of stitching mechanisms, cloth clamps, stop motion devices, a slidably mounted gaging device, gages mounted on the slidably mounted gaging device, a shaft, cams mounted on the shaft, connections between the cloth clamps and certain of the cams to lift said cloth clamps, connections between certain of the cams and the stop motion devices to shift the latter to operate the stitching mechanisms, and tripping mechanism connected with the slidable gaging device for throwing said shaft into operation.

11. In a button hole machine, the combination of stitching mechanisms, stop motion devices, cloth clamps, power mechanism, connections between the power mechanism and the cloth clamps to elevate the same and to the stop motion devices to shift the stop motion devices to cause the stitching mechanisms to operate, a slidably mounted gaging device including gages, means controlled by the slidably mounted gaging device for throwing into operation the power mechanism, automatic means operated by the power mechanism for withdrawing the slidably mounted gaging device after the same has been introduced under the cloth clamps and the latter have lowered, and means for automatically stopping the power mechanism.

12. In a button hole machine, the combination of stitching mechanisms, stop motion devices, cloth clamps, power mechanism, connections between the power mechanism and the cloth clamps to elevate the same and to the stop motion devices to shift the stop motion devices to cause the stitching mechanism to operate, a slidably mounted gaging device including gages, means including a tripping device controlled by the slidably mounted gaging device for throwing into operation the power mechanism, automatic means operated by the power mechanism for withdrawing the slidably mounted gaging device after the same has been introduced under the cloth clamps and the latter have lowered, and means operating the tripping device for automatically stopping the power mechanism before the completion of the stitching operation.

13. In a button hole machine, the combination of stitching mechanisms, cloth clamps, stop motion devices, main power mechanism, auxiliary power mechanism including a shaft and gearing engaging the main power mechanism, connections between the shaft and the cloth clamps to elevate the latter, connections between the stop motion devices and the shaft to start the stitching mechanisms, a slidably mounted gaging device including gages, a tripping device including a connection with the power shaft and the gaging device, a power shifter interposed between the shaft and the tripping device, a device on the shaft with which the power shifter engages to permit said shaft to stop and to start at predetermined times and to cause the main power mechanism to operate the auxiliary power mechanism.

14. In a button hole machine, the combination of stitching mechanism, mechanism for causing the stitching mechanism to complete a cycle of movement, a slidably mounted gaging device operable toward and from the stitching mechanism, and means for automatically withdrawing the slidably mounted gaging device independently of the article introduced to the stitching mechanism and before the stitching operation commences.

15. In a button hole machine, the combination of stitching mechanism, a cloth clamp, mechanism for causing the cloth clamp to raise and the stitching mechanism to complete a cycle of movement, a slidably mounted gaging device, means between the slidably mounted gaging device and the cloth clamp to cause the latter to be elevated before the starting of the cycle of movement of the stitching mechanism, and means for automatically withdrawing the slidably mounted gaging device after the cloth clamp is lowered and before the stitching operation is started.

16. In a button hole machine, the combination of stitching mechanism, mechanism for operating the stitching mechanism to complete a cycle of movement, a cloth clamp, a slidably mounted gaging device operable toward and from the stitching mechanism, means for automatically lifting the cloth clamp by the movement of the slidably mounted gaging device, means for automatically lowering the cloth clamp, automatic means for withdrawing the slidably mounted gaging device from beneath the clamp after the latter has been lowered, and means for stopping the stitching operation without stopping the mechanism which operated the stitching mechanism.

17. In a machine of the class described, the combination of stitching mechanisms, cloth clamps, power mechanism including continually operating parts and a normally stationary cam shaft, a movable gaging device, power shifting means between the cam shaft and the continually operating parts of the power mechanism, a device on the cam shaft for controlling the movement of said power shifting means, levers connected to the stitching mechanisms, cams on the cam shaft for operating said levers to start the stitching mechanisms, levers connected to the cloth clamps, cams on the cam shaft for lifting the cloth clamps, means between the gaging device and the power shifting means to cause the cam shaft to be operated, and a cam on the cam shaft for operating the means between the gaging device and the power shifting means to withdraw the gaging device from the cloth clamps.

18. In a button hole machine, the combination of two stitching mechanisms, two cloth clamps, two stop motion devices, a gaging device mounted to slide toward and from the stitching mechanisms, gages mounted on the gaging device, stops adjacent the sewing mechanisms with which the gages coöperate when placing an article to be operated upon, continually operating main power mechanism, auxiliary power mechanism operated at a predetermined time by the main power mechanism, means operable by the gaging device for causing the main power mechanism to operate the auxiliary power mechanism, connections between the auxiliary power and the stop motion devices and the cloth clamps whereby to start the stitching mechanisms and to lift the cloth clamps, and manually operated means for disconnecting the connections between the stop motion devices and the auxiliary power mechanism, without effecting the operation of the cloth clamps.

19. In a button hole machine the combination of stitching mechanism, cloth clamps, stop motion devices, continually operating power mechanism, auxiliary power mechanism operable by the main power mechanism, a gaging device slidable toward and from the stitching mechanisms, gages mounted on the gaging device, connections between the auxiliary power mechanism and the stop motion devices to shift the latter to operate the stitching mechanisms, connections between the auxiliary power mechanism and the cloth clamps, means operated by the gaging device for causing the auxiliary power mechanism to be operated by the main power mechanism, manual means for disengaging the connections between the auxiliary power mechanism and the stop motion devices to prevent operation of the stitching mechanisms, and manual means for operating one or both of the stop motion devices to start the stitching operation without starting the auxiliary power mechanism.

20. In a button hole machine, the combination of stitching mechanisms, stop motion devices, cloth clamps, continually operating main power mechanism, auxiliary power mechanism including a shaft and a cam, operable by the main power mechanism, connections between the auxiliary power mechanism and stop motion devices and the cloth clamps, a gaging device operable toward and from the stitching mechanisms, a shifter, trigger mechanism for holding the shifter in normal position, a connection between the trigger mechanism and the gaging device, whereby when the latter is moved to position an article to the stitching mechanisms the shifter will cause the main power mechanism to operate the auxiliary power mechanism, the trigger mechanism being operated upon by the cam to permit the shifter to operate to stop the auxiliary power mechanism.

21. In a button hole machine, the combination of stitching mechanisms, stop motion devices, cloth clamps, continually operating main power mechanism, auxiliary power mechanism operable by the continually operating main power mechanism, a movable gaging device including gages, connections between the auxiliary power mechanism and the stop motion devices whereby to start the stitching mechanisms, connections between the auxiliary power mechanism and the cloth clamps to elevate the latter, mechanism controlled by the gaging device for causing the main power mechanism to operate the auxiliary power mechanism, and means forming a part of the auxiliary power mechanism for automatically causing the means controlled by the gaging device to disconnect the auxiliary power mechanism from the main power mechanism.

22. In a button hole machine, the combination of stitching mechanisms, stop motion devices, cloth clamps, continually operating main power mechanism, auxiliary power mechanism operable by the continually operating main power mechanism, a movable gaging device including gages, connections between the auxiliary power mechanism and the stop motion devices to start the stitching mechanism, connections between the auxiliary power mechanism and the cloth clamps to elevate the latter, mechanism controlled by the gaging device for causing the main power mechanism to operate the auxiliary power mechanism, and means forming a part of the auxiliary power mechanism for automatically causing the means controlled by the gaging device to disconnect the auxiliary power mechanism from the continually operating main power mechanism before the stitching mechanisms cease their operations.

23. In a button hole machine, the combination of stitching mechanisms, stop motion devices, cloth clamps, a shaft, cams on the shaft, levers connected with the cloth clamps and operated upon by certain of the cams to elevate said cloth clamps, levers connected to the stop motion devices, said levers being operated by certain of the cams to shift the stop motion devices to start the stitching mechanisms, a slidable gaging device including gages, a timing disk having a seat and mounted on the shaft, a lever coöperating with the seat in the timing disk to stop the shaft, a connection between the gaging device and the lever which coöperates with the timing disk, said connection being operated upon by one of the cams to automatically withdraw the gaging device from under the cloth clamps, means for automatically causing the timing lever to drop into its seat, and power means for operating the shaft.

24. In a button hole machine, the combination of stitching mechanisms, stop motion devices, cloth clamps, fast and loose pulleys associated with each of the stitching mechanisms, main power mechanism including a continuous belt coöperating with the fast and loose pulleys of the stitching mechanisms, manually controlled means for each stop motion mechanism to operate the latter to shift the belt to start the respective stitching mechanism, auxiliary power mechanism operated by the main power mechanism, a connection between the auxiliary power mechanism and the stop motion devices to automatically start the stitching mechanisms, connections between the auxiliary power mechanism and the cloth clamps to automatically elevate the same, a slidably mounted gaging device including gages adapted to be moved toward and from the stitching mechanisms, means operated by the gaging device for causing the main power mechanism to operate the auxiliary power mechanism, and means operable by the auxiliary power mechanism for automatically disconnecting the auxiliary power mechanism from the main power mechanism.

25. In a button hole machine, the combination of stitching mechanism including a power shaft and fast and loose pulleys, a stop motion device, and a cloth clamp, main power mechanism, auxiliary power mechanism operable by the main power mechanism, means between the auxiliary power mechanism and the stop motion device to operate the latter to start the stitching operation, means between the auxiliary power mechanism and the cloth clamp to automatically elevate the latter, a belt included in the main power mechanism coöperating with either the fast or the loose pulley of the stitching mechanism, a movable gaging device including gages, means controlled by the gaging device for connecting the main power mechanism with the auxiliary power mechanism, means coöperating therewith for automatically withdrawing the gaging device after the cloth clamp has been lowered, means for automatically disconnecting the auxiliary power mechanism before the belt is shifted by the stop motion device to stop the stitching operation, manual means for disconnecting the means between the stop motion device and the auxiliary power mechanism without interfering with the operation of the cloth clamp, and means for manually operating the stop motion device.

26. In a button hole machine, the combination of stitching mechanism, cloth clamps, a stop motion device, constantly operating main power mechanism including a belt, auxiliary power mechanism including a fast pulley adapted to receive the belt of the continually operating power mechanism, a disk formed with a seat, a belt shifter coöperating with the belt and the disk, cams operated by the auxiliary power mechanism for operating the stop motion to start the stitching operation and for elevating the cloth clamps, a slidably mounted gaging device including gages, tripping mechanism for holding the belt shifter in the seat of the disk, a flexible connection between the gaging device and the tripping device whereby when the gaging device is forced up to the stitching mechanism the belt shifter will be operated to cause the belt to operate the auxiliary power mechanism, a cam for operating on the tripping device for automatically withdrawing the gaging device from under the cloth clamp, and means holding the tripping device and belt shifter under tension to retain the belt shifter adjacent the periphery of the disk and ready to fall into the seat after the withdrawal of the gaging device to normal position.

27. In a button hole machine, the combination of stitching mechanisms, stop motion devices, cloth clamps, continually operating power mechanism, auxiliary power mechanism including a shaft operable by the continually operating power mechanism, connections between the shaft and the cloth clamps including connected levers, cams and links coöperating with said levers and said cloth clamps, connections between the shaft and the stop motion devices including cams connected levers and hooked links suspended from the said stop motion devices and located in the path of movement of the connections between the levers, manual means for removing the hooked links from the path of movement of the connection between said levers, a gaging device, and means for causing the main power mechanism to operate the auxiliary power mechanism.

28. In a button hole machine, the combination of stitching mechanisms, stop motion devices, cloth clamps, continually operating power mechanism, auxiliary power mechanism including a shaft operable by the continually operating power mechanism, means between the shaft and the cloth clamps for automatically elevating the same, connections between the shaft and the stop motion devices including cams and connected levers and hooked links suspended from the said stop motion devices and located in the path of movement of the connection between the levers, manual means for removing the hooked links from the path of movement of the connections between said levers, a gaging device, and means for causing the main power mechanism to operate the auxiliary power mechanism.

29. In a button hole machine, the combination of stitching mechanisms, stop motion devices, cloth clamps, continually operating power mechanism, auxiliary power mechanism including a shaft operable by the continually operating power mechanism, connections between the shaft and the cloth clamps including connected levers, cams and links coöperating with the levers and said cloth clamps, connections between the shaft and the stop motion devices including cams and connected levers and hooked links suspended from the said stop motion devices and located in the path of movement of the connection between the levers, manual means for removing the hooked links from the path of movement of the connections between said levers, a gaging device, and means controlled by the inward movement of the gaging device for causing the main power mechanism to operate the auxiliary power mechanism including means for automatically stopping the auxiliary power mechanism.

30. In a button hole machine, the combination of stitching mechanism, a cloth clamp, a stop motion device, a slidably mounted gaging device including gages, main power mechanism, auxiliary power mechanism, a connection between the auxiliary power mechanism and the cloth clamp to elevate the latter, a connection between the stop motion device and the auxiliary power mechanism to shift the stop motion device to start the stitching mechanism, means controlled by the gaging device for connecting the auxiliary power mechanism with the main power mechanism, a cam operated by the auxiliary power mechanism for engaging the latter connecting means to automatically withdraw the gaging device after the cloth clamp has lowered, and automatic means for disconnecting the auxiliary power mechanism before the stitching mechanism stops its operation.

31. In a button hole machine, the combination of stitching mechanism, a cloth clamp, a stop motion device, a slidably mounted gaging device including gages, main power mechanism, auxiliary power mechanism, a connection between the auxiliary power mechanism and the cloth clamp to elevate the latter, a connection between the stop motion device and the auxiliary power mechanism to shift the stop motion device to start the stitching mechanism, means controlled by the gaging device for connecting the auxiliary power mechanism with the main power mechanism, a cam operated by the auxiliary power mechanism for engaging the latter connecting means to automatically withdraw the gaging devices after the cloth clamp has lowered, automatic means for disconnecting the auxiliary power mechanism before the stitching mechanism stops its operation, manually operated means for disconnecting the connection between the stop motion device and the auxiliary power mechanism, and manual means for operating the stop motion device without operating the auxiliary power mechanism.

32. In a machine of the class described, the combination of stitching mechanism, a gaging device for gaging and locating an article and for starting the stitching mechanism, and means for automatically removing the gaging device before the stitching operation is started.

33. In a machine of the class described, the combination of stitching mechanism, a gaging device including gages to gage an article to be operated upon, a guide for said gaging device anti-friction rollers between the guide and the gaging device, power means, means between the gaging device and the power means for controlling the latter, and means for automatically removing the gaging device before the stitching operation is started.

34. In a buttonhole machine, the combination of stitch forming mechanism, a work clamp, a gaging device movable toward and from the stitch forming mechanism, power mechanism for operating the stitch forming mechanism, means connected with the gaging device for starting the power mechanism, means for automatically lowering the work clamp before the stitching operation is started, and means operated by the power mechanism for removing the gaging device independently of the work and before the stitching operation is started.

35. In a buttonhole machine, the combination of stitching mechanism, a work clamp, a slidably mounted gaging device, stationary gages coöperating with the slidably mounted gaging device, power mechanism, means for automatically starting the power mechanism by movement of the gaging device, means for limiting the movement of the gaging device after the power mechanism has been started, and the work has been gaged against the stationary gages, means operated by the power mechanism for withdrawing the gaging device, and means for lowering the work clamp to hold the work in gaged position before the gaging device is withdrawn.

36. In a buttonhole machine, the combination of stitch forming mechanism, a work clamp normally in lowered position, a slidably mounted gaging device adapted to deliver work under the work clamp when same is elevated, power mechanism, means operated by the slidably mounted gaging device for starting the stitching mechanism and elevating the work clamp, means for automatically lowering the work clamp, means operated by the power mechanism for retracting the gaging device and leaving the work held by the work clamp, and means operated by the power mechanism for stopping the stitching operation before the work clamp is elevated.

37. In a buttonhole machine, the combination of stitching mechanism, a work clamp, a reciprocating gaging device, power mechanism for operating the stitching mechanism, means operated by the reciprocating device for starting the power mechanism, said means being adapted to be engaged upon each reciprocation of the gaging device to form continuous successive operations of the stitching mechanism and continuous operation of the power mechanism, means operated by the power mechanism to lift the work clamp between each reciprocation of the gaging device, means for lowering the work clamp and means operated by the power mechanism for withdrawing the gaging device upon the lowering of the work clamp.

38. In a buttonhole machine, the combination of stitching mechanism, a work clamp, a gaging device, power mechanism, means operated by the power mechanism for elevating the work clamp, means for automatically lowering the work clamp, means operated by the power mechanism for withdrawing the gaging device after the work clamp is lowered and the work is held in position for receiving the stitches, and means for stopping the power mechanism after the stitching mechanism has operated and before the work clamp has been elevated.

39. In a buttonhole machine, the combination of stitching mechanisms, stop motion devices, cloth clamps, a gaging device slidably mounted between the stitching mechanisms including a pair of gages, a gage adjacent each stitching mechanism coöperating with the gages on the gaging device to locate the work, continually operating main power mechanism, auxiliary power mechanism, means operated by the gaging device to cause the main power mechanism to operate the auxiliary power mechanism upon each movement of the gaging device toward the stiching mechanism, means operated by the auxiliary power mechanism for elevating the clamps, to permit of the introduction of work, means for withdrawing the gaging device from the cloth clamps, means for automatically disconnecting the auxiliary power mechanism from the main power mechanism, and means independent of the auxiliary power mechanism for operating the stop motion devices to stop the sewing mechanism.

40. In a buttonhole machine, the combination of stitching mechanism, a cloth clamp, a stop motion device, main power mechanism, auxiliary power mechanism, a gaging device means operated by the gaging device for causing the main power mechanism to operate the auxiliary power mechanism, a connection between the auxiliary power mechanism and the cloth clamp to elevate the latter, a connection between the auxiliary power mechanism and the stop motion device to cause the main power mechanism to operate the stitching mechanism, automatic means for stopping the auxiliary power mechanism, and automatic means for operating the stop motion device independently of the auxiliary power mechanism.

41. In a buttonhole machine, the combination of stitching mechanism, a stop motion device, a manually operable gaging device, main power mechanism, auxiliary power mechanism, means operable by the gaging device for causing the main power mechanism to operate the auxiliary power mechanism to throw the stop motion device to operate the stitching mechanism, automatic means for stopping the auxiliary power mechanism, and means for automatically operating the stop motion device to stop the stitching mechanism independently of the auxiliary power mechanism.

42. In a buttonhole machine, the combination of two stitching mechanisms, a gage associated with each stitching mechanism, a slidably mounted gaging device including gages which coöperate with the gages associated with the stitching mechanisms, means for limiting the movement of the gaging device when the work is gaged, cloth clamps for the stitching mechanisms, main power mechanism, auxiliary power mechanism, means controlled by the movement of the gaging device for causing the main power mechanism to operate the auxiliary power mechanism to elevate the cloth clamps to permit subsequent movement of the gaging device to gage the work, the auxiliary power mechanism including means for permitting of the lowering of the cloth clamps, and means for withdrawing the gaging device independently of the work, subsequently operating the stitching mechanism, and automatic means independent of the auxiliary power mechanism for stopping the stitching mechanisms.

43. In a buttonhole machine, the combination of stitching mechanisms, a gage associated with each stitching mechanism, a slidably mounted gaging device including gages which coöperate with the gages associated with the stitching mechanisms, means for limiting the movement of the gaging device when the work is gaged, cloth clamps for the stitching mechanisms, main power mechanism, auxiliary power mechanism, means controlled by the movement of the gaging device for causing the main power mechanism to operate the auxiliary power mechanism to elevate the cloth clamps, to permit subsequent movement of the gaging device to gage the work, the auxiliary power mechanism including means for permitting of the lowering of the cloth clamps, and means for withdrawing the gaging device independently of the work, subsequently operating the stitching mechanism, automatic means independent of the auxiliary power mechanism for stopping the stitching mechanisms, and means associated with each stitching mechanism for operating either of said mechanisms, before the work clamp is elevated.

44. In a buttonhole machine, the combination of stitching mechanism, a normally lowered cloth clamp, a slidably mounted manually operated gaging device, power mechanism, tripping means controlled by the manually operated gaging device for causing the power mechanism to first elevate the clamp, then permit the clamp to lower and subsequently start the stitching mechanism, the tripping means, gaging device and cloth clamp being arranged so that the gaging device in its movement to introduce the work must be stopped between the starting of the power mechanism and the lifting of the clamp, and subsequently moved again in its first direction to introduce the work under said cloth clamp, and means for automatically withdrawing the gaging device from the clamp independent of the work, after the clamp is lowered.

45. In a button-hole machine, stitching mechanism, power mechanism therefor, control devices intermediate said power mechanism and stitching mechanism, auxiliary power mechanism for operating the control devices, and a gaging device governing the operation of the auxiliary power mechanism.

46. In a buttonhole machine, stitching mechanism, controlling devices therefor, power mechanism in part normally operative to actuate the stitching mechanism and in part normally inoperative for operating the controlling devices to start said stitching mechanism, and a manually operated gaging device controlling the normally inoperative part of the power mechanism.

47. In a buttonhole machine, stitching mechanism, controlling devices therefor, power mechanism in part normally operative to actuate the stitching mechanism and in part normally inoperative for operating the controlling devices to start said stitching mechanism, a manually operated gaging device movable to and from the stitching mechanism, said gaging device controlling the normally inoperative part of the power mechanism, and means operated by the normally inoperative part of the power mechanism for automatically operating the gaging device for a predetermined part of the movement of said device from the stitching mechanism.

48. In a buttonhole machine, stitching mechanism, a manually operated gaging device movable to and from the stitching mechanism, power mechanism, and stitching-mechanism control-devices normally held from the influence of the power mechanism said gaging device controlling said stitching mechanism controlled devices.

49. In a buttonhole machine, stitching mechanism, normally operative power means, control devices intermediate the power means and stitching mechanism for starting the latter, said control devices being normally inoperative, and mechanism operated directly by the power means for timedeterminate for the governing of the control devices, and manually controlled means for governing said mechanism that is operated directly by the power means.

50. In a machine of the class described, the combination of stitching mechanism, a gaging device including gages to gage an article to be operated upon, a guide for said gaging device, manually operated means for positioning said gaging device and the article to be operated upon by the stitching mechanism, and means to cause said gaging device to be withdrawn from gaging position before the stitching mechanism commences to operate.

In testimony whereof I have signed my name to this specification in the presence of two subscribing witnesses.

HENRY C. MILLER.

Witnesses:
H. R. van Kleeck,
Charles Winne.